Nov. 5, 1929.  W. M. STEWARD ET AL  1,734,834
LIGHT PROJECTOR
Filed June 28, 1927   2 Sheets-Sheet 1

Inventors
Willard M. Steward
AND Harold C. Block
By J. W. Milburn
Attorney

Nov. 5, 1929.  W. M. STEWARD ET AL  1,734,834
LIGHT PROJECTOR
Filed June 28, 1927   2 Sheets-Sheet 2

Inventors
Willard M. Steward
and Harold C. Block
By J. W. Milburn
Attorney

Patented Nov. 5, 1929

1,734,834

UNITED STATES PATENT OFFICE

WILLARD M. STEWARD, OF NEW YORK, N. Y., AND HAROLD C. BLOCK, OF HOUSTON, TEXAS

LIGHT PROJECTOR

Application filed June 28, 1927. Serial No. 202,109.

The present invention relates to light projectors for automobiles and particularly to a projector which is adapted for use as an automobile headlight.

The principal object of our invention is to provide a headlight for automobiles which is so designed that no direct or glaring light rays will be projected therefrom. Our invention is so constructed that all of the rays projected from the device will be reflected rays, rather than direct rays, the source of light being entirely out of the path of vision of anyone viewing the headlight from the front, the rays from the source of light being projected to reflectors and thence reflected forward to the roadway.

Another object of our invention is to provide a light projector which will direct reflected and diffused or screened rays directly ahead of the automobile, in addition to the reflected and unscreened rays thrown upon the roadway.

A still further object of the invention is to provide a headlight or light projector which can be readily and economically manufactured.

Other objects and advantages of the invention will be apparent from a reading of the following specification and the accompanying drawings, in which Fig. 1 is a side elevation of one headlight.

Figure 1:
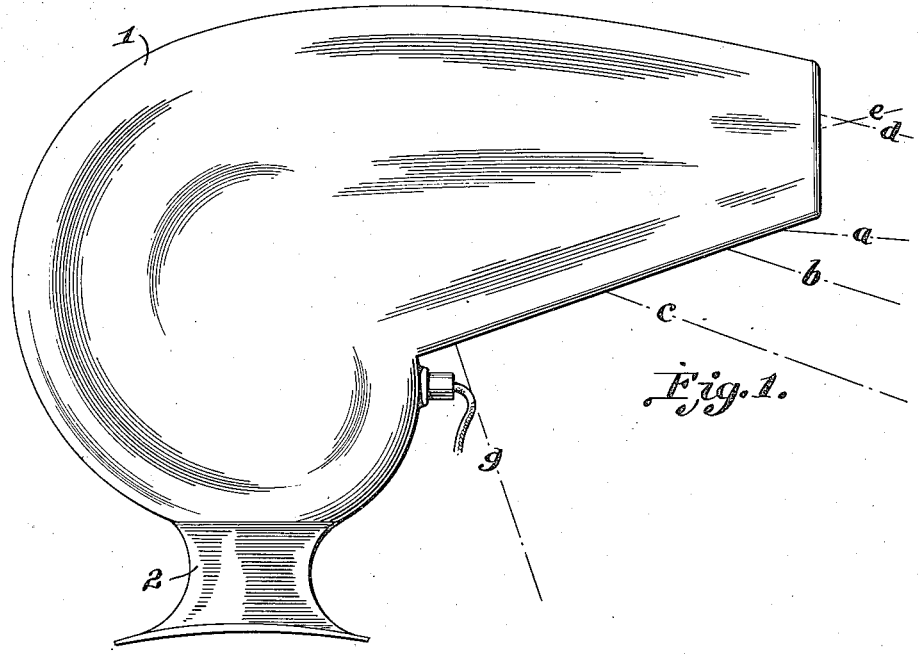

In the drawings, wherein the numerals refer to like parts throughout the views, the numeral 1 indicates the casing of our headlight, which may be supported on the mudguard of an automobile by means of a pedestal 2 or it may be secured to the front of the automobile by any desired form of bracket.

Figure 2:
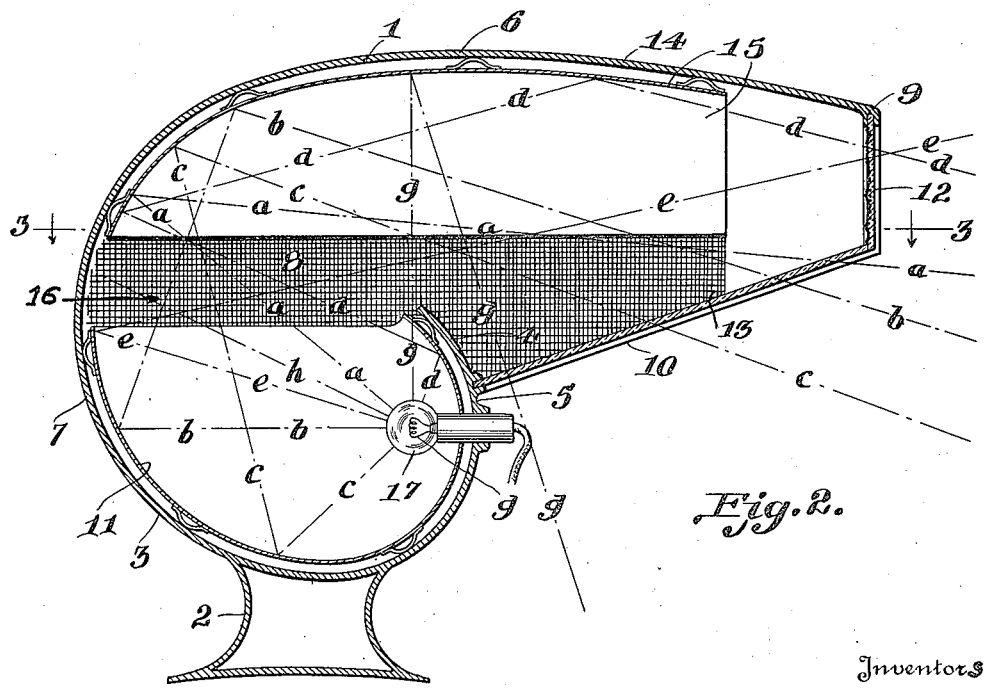
Fig. 2 is a vertical sectional view through the headlight.
Figure 3:
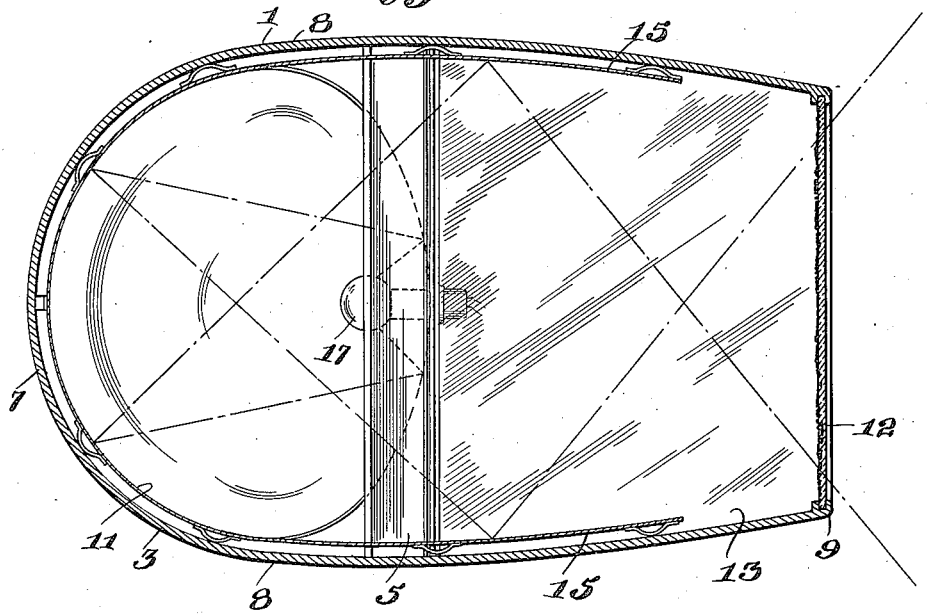
Fig. 3 is a horizontal sectional view on the line 3—3 of Fig. 2.
Figure 4:
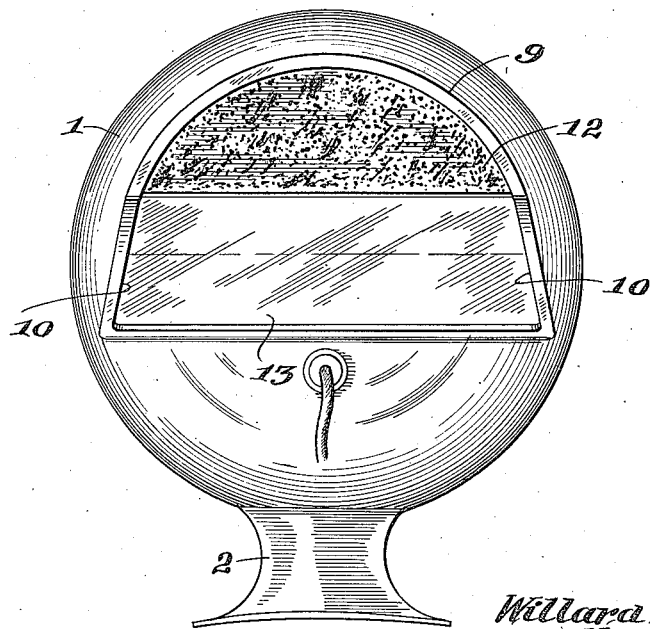
Fig. 4 is a front elevation of the headlight.

The lower or bulb-containing portion 3 of our projector casing 1 is substantially bowl-shaped, the upper edge 4 of its front wall 5 being inclined inwardly, as shown in Fig. 2. The upper portion 6 of the projector is in the form of an elongated hood, its lower rear edges forming continuations of the rear wall 7 and side walls 8 of the lower casing portion 3. However, the forward edge 9 of the upper or hood portion 6 extends forward a substantial distance past the upper edge 4 of the lower or bulb-carrying portion 3 and the forward side edges 10 extend downwardly somewhat below the upper front edge 4 of the bulb-carrying portion 3 to prevent light rays from being projected too far to the side by the projector.

A vertically disposed glass or lens 12 of frosted or colored glass is suitably fitted in the front end of the upper or hood portion 6 and a clear glass or lens 13 (preferably optically correct) is fitted in the lower edges of the forwardly extending section 14 of the hood 6. This last mentioned lens is supported at an angle to the horizontal, its forward edge supported against the lower edge of the frosted lens 12 and its rear or inner edge being supported on the front wall of the bulb-carrying portion 3, somewhat below the upper edge 4 of the latter.

A cup-shaped lower reflector 11 is fitted within the bulb-carrying portion 3 and conforms generally to the shape of this portion of the projector, the upper rear and side edges of the reflector being slightly below the front edge 4 of the bulb-carrying casing portion 3.

An upper reflector 15 is supported in the hood portion 6 of the projector and conforms substantially to the shape of this hood, except that its lower edges do not extend down to the plane of the lower edge of the frosted lens 12 and its forward edge terminates somewhat to the rear of the lens 12. The reflectors 11 and 15 are secured to the interior of the casing 1 by means of solder or they may be riveted or bolted within the casing. The remainder of the inner surface of the casing 1, and particularly the portion 16 between the upper edge of the lower reflector 11 and the lower edge of the upper reflector 15 would be blackened or otherwise treated to prevent light rays from being reflected therefrom.

In use, our projector would be positioned upon the automobile at such a height that light rays projected through the clear lens 13 would be below the level of the eyes of approaching motorists. As shown diagrammatically in Fig. 2, light rays projected downwardly from the light bulb 17 would be reflected from the lower reflector 11 up to the rear edge of the upper reflector 15 and thence forward and down upon the roadway, all as indicated by the lines c. Light rays projected horizontally from the light bulb 17 would be reflected from the rear side of the lower reflector 11 to the rear of the upper reflector 15 and these rays would also be projected through the clear lens 13. These last mentioned light rays are indicated by the lines b. Light rays a projected upwardly at an angle from the bulb 17 would be reflected from the lower rear edge of the upper reflector 15 and thence through the clear lens 13 to the roadway. Light rays g projected directly upward from the bulb would be reflected down through the clear lens 13 by the upper reflector 15. Rays d projected to the front of reflector 11 by the bulb 17 would be reflected from the lower rear edge of upper reflector 15 to the front edge of the same reflector and thence forwardly through the translucent lens 12. Light rays e would be projected to the rear upper edge of the lower reflector 11 and thence upwardly through the translucent lens 12. Light rays h which are projected from the bulb 17 at such an angle as to reach the non-reflecting surface would of course not be reflected and therefore no reflecting surface would be visible to a person viewing the projector from the front, the reflector 15 being screened from the front by the translucent lens 12 and the reflector 11 being invisible because it is behind the front wall 5 of the lower casing portion 3. Also, light rays which strike the upper forward edge of reflector 11 and which are projected horizontally to the rear and upon non-reflecting surface 16 will not be reflected therefrom, thus preventing blinding of approaching drivers.

It will be seen that the headlight cannot project any direct light rays into the eyes of approaching drivers or pedestrians, the only light rays which would be visible to approaching drivers being those projected through translucent lens 12. These rays will not blind the approaching drivers but they will serve to indicate the position and approach of the automobile upon which our projector is used. All of the bright rays will be reflected downwardly upon the road through the clear lens 13 and sufficient illumination for the driver of the car will thus be afforded in the place where it is most desirable. The lens 13 would be positioned at such an angle as to cast light upon the road a sufficient distance ahead of the car to meet legal requirements.

The bulb 17 may of course be adjusted either upwardly or downwardly to focus the rays at varying distances in front of the vehicle.

We claim:—

1. A light projector comprising a lower casing portion, an upper casing portion, said upper casing portion extending forwardly and substantially horizontal past the upper forward edge of the lower casing portion, a light-bulb in said lower casing portion, a reflector in said lower casing portion, a reflector in said upper casing portion, a vertical translucent glass in the front opening of the upper casing portion and opposite said upper reflector and a clear glass beneath said translucent glass and opposite the space between said reflectors, the space between said reflectors being treated to render it non-reflecting.

2. A light projector comprising a lower and bulb-carrying lower casing portion, an upper casing portion, the forward upper edge of said upper casing portion extending forwardly and substantially horizontally past the forward upper edge of said lower casing portion, a light-bulb in the front inside wall of said lower casing portion, a reflector in said lower casing portion, a reflector in said upper casing portion, the space between said reflectors being non-reflecting, a vertical translucent glass at the forward end of said upper casing portion and opposite said upper reflector and a clear glass extending downwardly and back from the lower edge of said translucent glass to the front wall of the lower casing.

WILLARD M. STEWARD.
HAROLD C. BLOCK.